United States Patent [19]
Okuhara et al.

[11] Patent Number: 6,109,164
[45] Date of Patent: Aug. 29, 2000

[54] BRAKE DEVICE FOR AUTOMOBILE

[75] Inventors: Hisakazu Okuhara; Takahiro Kamei; Masahiro Saitou; Ken Hanayama, all of Wako, Japan

[73] Assignee: Honda Giken Kogyo Kabushiki Kaisha, Tokyo, Japan

[21] Appl. No.: 09/070,930

[22] Filed: May 1, 1998

[30] Foreign Application Priority Data

May 9, 1997 [JP] Japan ................................... 9-119172
May 9, 1997 [JP] Japan ................................... 9-119173

[51] Int. Cl.$^7$ ...................................................... F15B 9/10
[52] U.S. Cl. ........................... 91/376 R; 60/403; 60/533; 60/552; 60/582; 74/579 R; 403/282; 403/274; 403/41; 188/371; 188/372; 188/376; 188/374
[58] Field of Search ........................... 91/376 R; 60/552, 60/582, 533, 403; 403/282, 274, 41; 74/581, 579 R; 188/371, 377, 376, 374

[56] References Cited

U.S. PATENT DOCUMENTS 5,531,135  7/1996  Dolla ......................................... 74/560

FOREIGN PATENT DOCUMENTS 6-211115  8/1994  Japan .

*Primary Examiner*—Edward K. Look
*Assistant Examiner*—Hermes Rodriguez
*Attorney, Agent, or Firm*—Arent Fox Kintner Plotkin & Kahn, PLLC

[57] ABSTRACT

A push rod of a vacuum booster includes an inner rod section, a pipe-shaped outer rod section which is slidably fitted over an outer periphery of a rear portion of the inner rod section and connected to a brake pedal, and a buffer member made of a synthetic resin and fitted over the outer periphery of the inner rod section in front of the outer rod section. Usually, an end face of the outer rod section is retained in a position in which it abuts against a projection of the inner rod section. When an axial compressing force is applied to the push rod upon a collision of an automobile, the end face of the outer rod section slides forwards over and past the projection, while buckling the buffer member. Thus, the pushing-up of the brake pedal toward a vehicle compartment due to the retreating movement of a master cylinder is prevented, and the load applied to a driver's foot is alleviated.

4 Claims, 8 Drawing Sheets

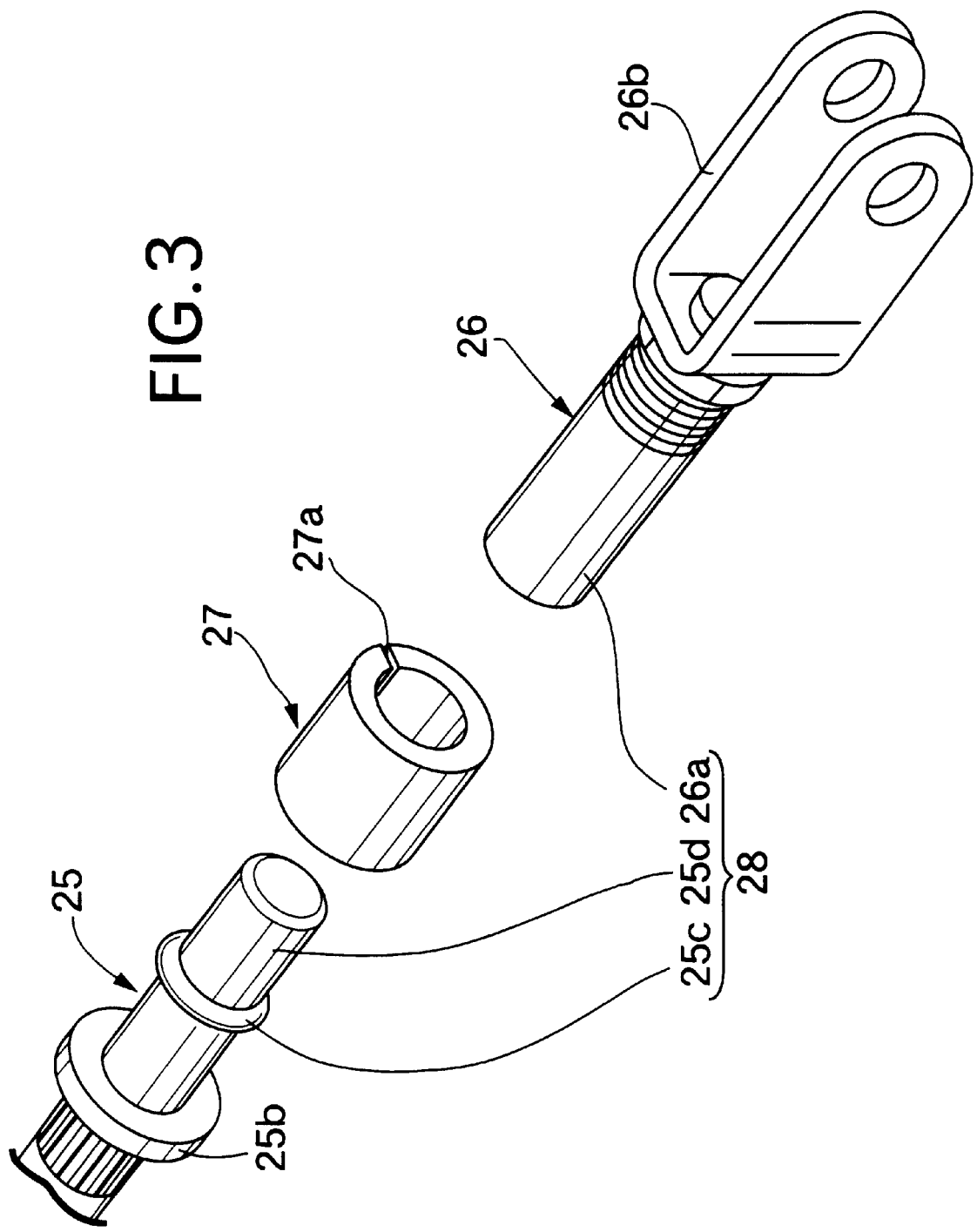

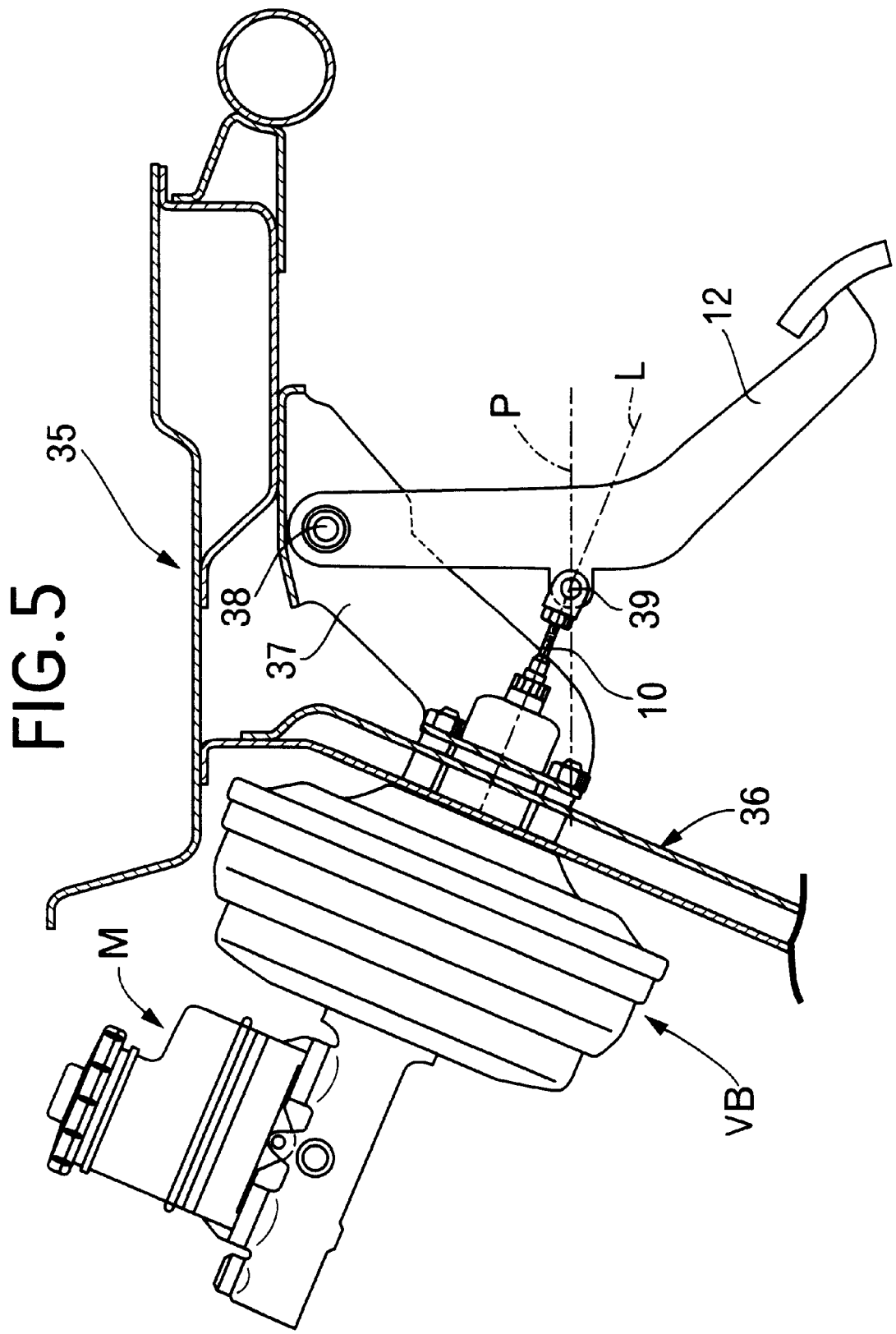

BRAKE DEVICE FOR AUTOMOBILE

BACKGROUND OF THE INVENTION

1. Field of the Invention

The present invention relates to a brake device for an automobile for braking a wheel by brake hydraulic pressure. The brake hydraulic pressure is generated by a brake hydraulic pressure generating means due to depression of a brake pedal.

2. Description of the Related Art

A brake pedal of an automobile is supported on a dash board which rises from a floor panel of the vehicle. For this reason, when a shock generated upon a collision of the automobile causes the dash board to retreat toward a vehicle compartment along with the brake pedal, there is a possibility that a load may be applied to a driver's foot which is placed on the brake pedal. To alleviate the load applied to the driver's foot during a collision, a brake device is known from Japanese Patent Application Laid-open No. 6-211115, in which a pedal bracket for rotatably supporting an upper end of a brake pedal and a dash board are connected to each other so as to be separable due to a shock. Upon collision of the vehicle, the pedal bracket, which is separated from the dash board, is rotated forwards along with the brake pedal to alleviate the load applied to the driver's foot.

The degree and magnitude of deformation of the dash board varies depending upon the extent of the collision. For this reason, in the known device, there is a possibility that the bracket may not reliably be separated from the dash board depending upon the extent of the collision. Hence, the brake pedal cannot be rotated forwards.

SUMMARY OF THE INVENTION

Accordingly, it is an object of the present invention to reliably alleviate the load received by the driver's foot from the brake pedal upon a collision of the automobile.

To achieve the above object, according to a first aspect and feature of the present invention, there is provided a brake device for an automobile, comprising a brake pedal operated by a driver and connected to a push rod of a brake hydraulic pressure generating means which generates a brake hydraulic pressure. The push rod includes an inner rod section, an outer rod section axially slidably supported on an outer periphery of the inner rod section, and a coupling means for integrally coupling both rods to each other. The coupling means is adapted to release the coupling to permit the sliding of the outer rod section when an axial compressing force, equal to or larger than a predetermined value, is applied between both rods.

With the above arrangement, when the driver depresses the brake pedal to cause an axial compressing force which is smaller than a predetermined value to be applied between both rods, the rods are moved together to transmit the movement of the brake pedal to the brake hydraulic pressure generating means. When the brake hydraulic pressure generating means is retreated, due to the collision of the automobile, the axial compressing force equal to or larger than the predetermined value is applied between both rods. The coupling by the coupling means is then released to permit the rods to slide relative to each other. Thus, the forward stroke of the brake pedal is permitted to alleviate the load applied to the driver's foot.

The term "predetermined value" means a value which is larger than an axial compressing force which is generated by the driver applying a normal depressing force to the brake pedal and which is smaller than an axial compressing force which is generated by the retreating movement of the brake hydraulic pressure generating means due to the collision of the automobile.

In this case, an end face of the outer rod section may be put into contact with a projection formed on an outer periphery of the inner rod section. When the axial compressing force is applied between both rods, the outer rod section slides over and past the projection. With such a construction, the magnitude of the axial compressing force which permits the coupling by the coupling means to be canceled, can be regulated by changing the height and/or shape of the projection. Moreover, the load applied to the driver's foot can be effectively alleviated by a resisting force which is generated when the outer rod section slides over and past the projection.

Further, a buffer member may be supported between a stopper which is formed on an outer periphery of the inner rod section and the projection. Thus, an end face of the sliding outer rod section pushes the buffer member against the stopper to buckle the buffer member. With such a construction, it is possible to further effectively alleviate the load applied to the driver's foot by a resisting force resulting from buckling of the buffer member upon sliding of the outer rod section.

To achieve the above object, according to a second aspect and feature of the present invention, there is provided a brake device for an automobile, comprising a brake pedal operated by a driver. The brake pedal is connected to a rear end of a push rod of a brake hydraulic pressure generating means which generates a brake hydraulic pressure. An axis of the push rod is disposed to be inclined with respect to a horizontal plane. When an axial compressing force, which is equal to or larger than a predetermined value, is applied to the push rod upon collision of the automobile, the push rod is flexed to permit the movement of the brake pedal in a forward direction of a vehicle body.

With the above arrangement, when the driver depresses the brake pedal causing an axial compressing force, which is smaller than the predetermined value to be applied to the push rod, the push rod, without being flexed, transmits the movement of the brake pedal to the brake hydraulic pressure generating means. When the brake hydraulic pressure generating means is retreated due to the collision of the automobile, an axial compressing force, which is equal to or larger than the predetermined value, is applied to the push rod. The push rod is flexed by application of a flexing load to the push rod. Since the push rod is disposed to be inclined, a forward stroke of the brake pedal alleviates the load applied to the driver's foot.

The term "predetermined value" means a value which is larger than an axial compressing force which is generated by the driver applying a normal depressing force to the brake pedal and which is smaller than an axial compressing force which is generated by the retreating movement of the brake hydraulic pressure generating means due to the collision of the automobile.

The above and other objects, features and advantages of the invention will become apparent from the following description of the preferred embodiments taken in conjunction with the accompanying drawings.

BRIEF DESCRIPTION OF THE DRAWINGS

FIGS. 1 to 4B show a first embodiment of the present invention, wherein

FIG. 1 is a longitudinal sectional view of a vacuum booster;

FIG. 2 is an enlarged view of an essential portion shown in FIG. 1;

FIG. 3 is an exploded perspective view of a push rod;

FIGS. 4A and 4B are views for explaining the operation upon a collision of an automobile;

FIGS. 5 to 8 show a second embodiment of the present invention, wherein

FIG. 5 is a longitudinal sectional view of a front portion of a vehicle compartment including a vacuum booster;

FIG. 6 is an enlarged sectional view of the vacuum booster;

FIG. 7 is a view for explaining the operation upon a collision of an automobile; and FIG. 8 is a graph showing the load applied to a brake pedal.

DETAILED DESCRIPTION OF THE PREFERRED EMBODIMENTS

The present invention will now be described by way of particular embodiments with reference to the accompanying drawings.

A first embodiment of the present invention will now be described with reference to FIGS. 1 to 4.

Figure 1:
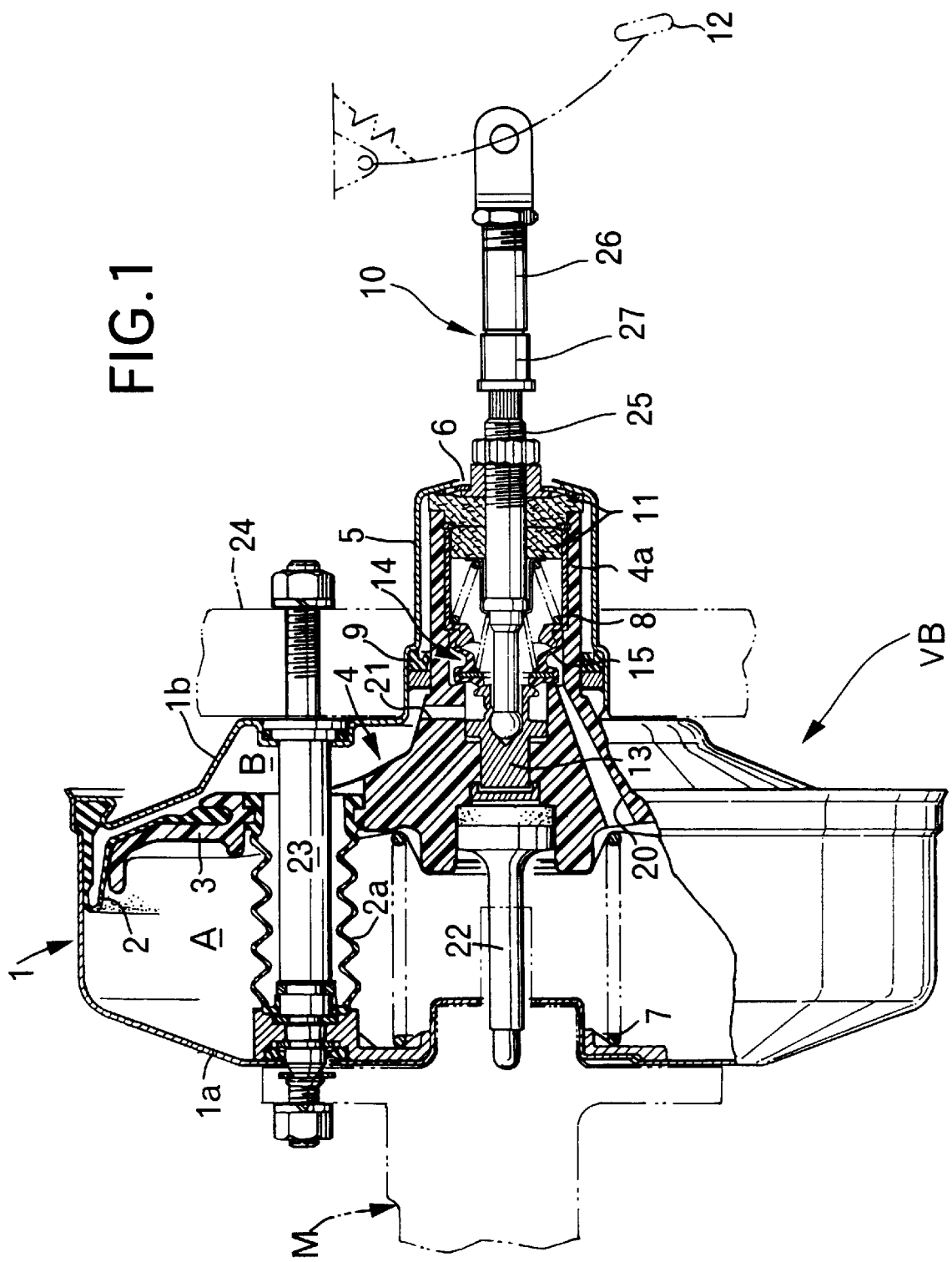
Figure 2:
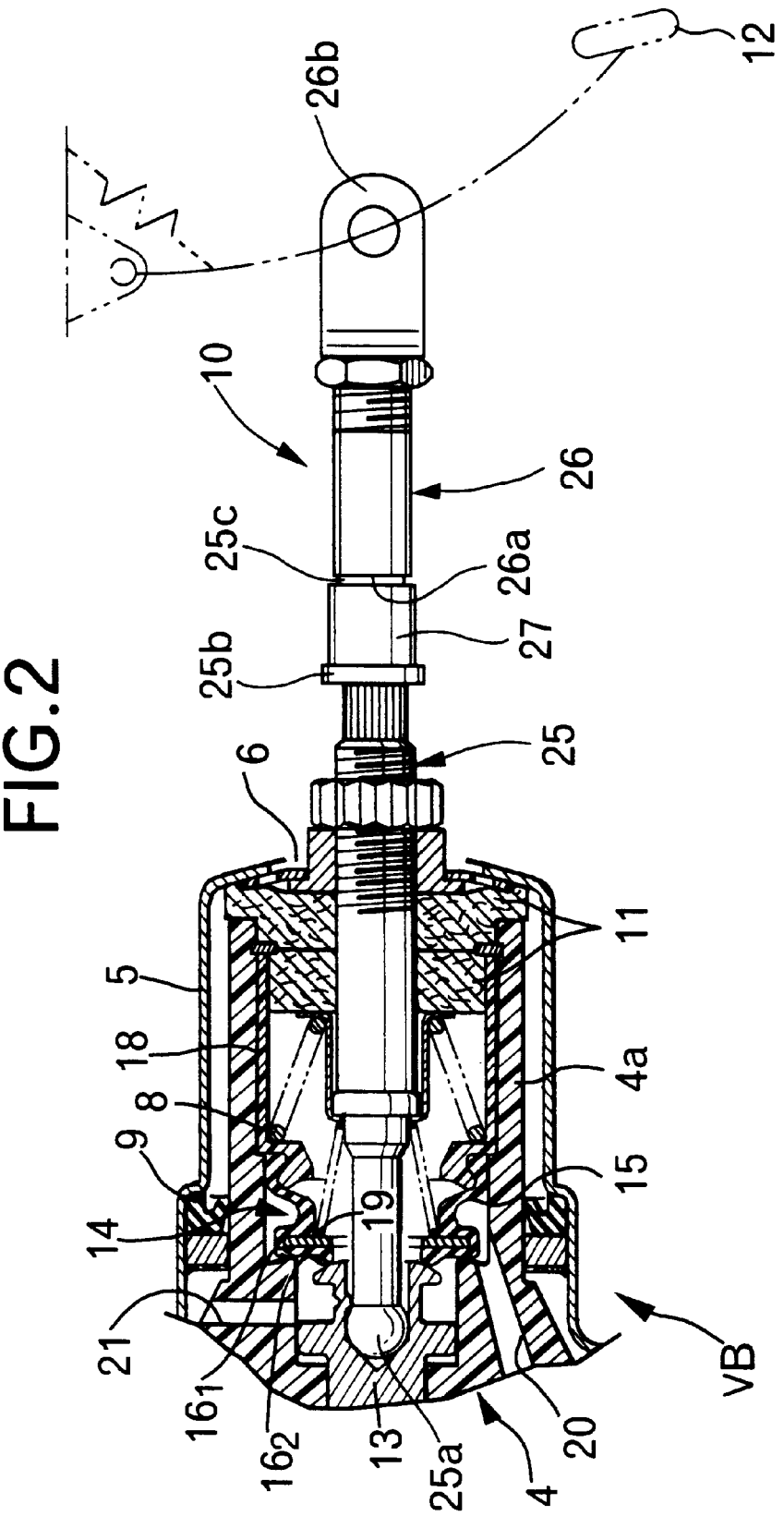

As shown in FIGS. 1 and 2, a booster shell 1 of a vacuum booster VB, constituting a brake hydraulic pressure generating means, includes a pair of front and rear shell halves 1a and 1b with their opposed ends coupled to each other. A booster piston 3, having a diaphragm 2 coupled to its rear surface, is received in booster shell 1 for longitudinally reciprocating movement. The diaphragm 2 has an outer periphery fixed to coupled portions of the shell halves 1a and 1b, and has an inner periphery fixed to an outer periphery of a front portion of a piston boss 4. The inside of the booster shell 1 is divided by the booster piston 3 and the diaphragm 2 into a front-side vacuum chamber A which faces a front surface of the booster piston 3, and a rear-side working chamber B which faces a rear surface of the diaphragm 2. A rearward extending tube 5 is integrally formed at a central portion of a rear wall of the shell half 1b. An air inlet 6 is defined in a rear end of the rearward extending tube 5. The vacuum chamber A normally communicates with the inside of an intake manifold (not shown) of an internal combustion engine, which is a vacuum source. The booster piston 3 is biased rearwards by a return spring 7 which is mounted between the booster piston 3 and the shell half 1a.

The piston boss 4 includes a cylindrical portion 4a which is slidably supported in the rearward extending tube 5 with a seal member 9 interposed therebetween. A filter 11, which is deformable so as not to obstruct the operation of an input rod 10, is mounted in a rear area of the cylindrical portion 4a. The filter 11 purifies the air introduced through the air inlet 6. A valve piston 13 is connected to a tip end of the input rod 10 which is connected to a brake pedal 12. The valve piston 13 is slidably supported at the center of the piston boss 4. A control valve 14 is provided in the cylindrical portion 4a of the piston boss 4. The control valve 14 is switchably operated in response to the relative movement of the valve piston 13 relative to the piston boss 4 by the advancing/retreating operation of the input rod 10.

The structure of the control valve 14 will be described below. The control valve 14 includes a) a valve member 15 made of a rubber, b) an annular first valve seat $16_1$ which is formed within the piston boss 4, so that the valve member 15 can seat on the valve seat $16_1$, and c) a second valve seat $16_2$ which is formed angularly at a rear end of the valve piston 13 and surrounded by the first valve seat $16_1$, so that the valve member 15 can seat on the valve seat $16_2$. The valve member 15 is formed cylindrically and fixed at its rear end to a valve member retaining tube 18 which is fitted to an inner periphery of the cylindrical portion 4a of the piston boss 4. The valve member 15 has a front end portion formed at an increased wall thickness so as to be able to seat on the first valve seat $16_1$ and the second valve seat $16_2$. The valve member 15 is biased toward the first and second valve seats $16_1$ and $16_2$ by a valve spring 19 which is mounted between the valve member 15 and the input rod 10. The input rod 10 is biased in a retreating direction by a return spring 8 which is mounted between the input rod 10 and the valve member retaining tuber 18.

The outside of the first valve seat $16_1$ communicates with the vacuum chamber A through a through-hole 20 provided in the piston boss 4. Intermediate portions of the first and second valve seats $16_1$ and $16_2$ communicate with the working chamber B through another through-hole 21 which is provided in the piston boss 4. The inside of the second valve seat $16_2$ communicates with the air inlet 6 through the inside of the valve member 15.

In such a control valve 14, when the valve member 15 is seating on the first and second valve seats $16_1$ and $16_2$, the communication between the vacuum chamber A and the working chamber B is cut off, and the communication between both chambers A and B and the air inlet 6 is also cut off. Thus, the control valve 14 is in a neutral state. When the valve piston 13 is advanced from the neutral state relative to the piston boss 4, the second seat $16_2$ is moved away from the valve member 15, thereby causing the working chamber B to communicate with the air inlet 6 through the through-hole 21. When the valve piston 13 is retreated relative to the piston boss 4, the valve member 15 is moved away from the first valve seat $16_1$, thereby causing the vacuum chamber A and the working chamber B to communicate with each other through the through-holes 20 and 21.

The piston boss 4 is provided with a forward extending output rod 22 which is connected to a master cylinder M which constitutes the brake hydraulic pressure generating means. The vacuum booster B is fixed to a dash board 24, which defines a front portion of a vehicle compartment, by a rod 23 extending longitudinally through the booster shell 1. The master cylinder M is commonly fastened to the booster shell 1. An outer periphery of the rod 23 is covered with a boot 2a, which is integrally provided on the diaphragm 2, so that the vacuum chamber A and the working chamber B do not communicate with each other.

The structure of the push rod 10 will be described below. The push rod 10 comprises a) an inner rod section 25 accommodated within the rearward extending tube 5, b) a pipe-shaped outer rod section 26 which is slidably fitted over an outer periphery of a rear portion of the inner rod section 25 which protrudes from the rearward extending tube 5, c) a buffer member 27 made of a synthetic resin which is fitted over the outer periphery of the inner rod 25 in front of the outer rod section 26, and d) a coupling means 28 which is adapted 1) to normally integrally couple both the rod sections 25 and 26 and 2) to permit the sliding movement of the outer rod section 26 relative to the inner rod 25, when an axial compressing force, which is equal to or larger than a predetermined value, is applied to between both the rod sections 25 and 26.

A spherical portion 25a is formed at a front end of the inner rod section 25 and is oscillatably coupled to the valve piston 13. A collar-shaped stopper 25b, an annular projection 25c and a guide portion 25d are formed to the rear of the spherical portion 25a. The guide portion 25d supports the outer rod section 26 for sliding movement. The cylindrical buffer member 27, having a slit 27a in its side, is supported between the stopper 25b and the projection 25c of the inner rod section 25. When the buffer member 27 is mounted on the inner rod section 25, the buffer member 27 can be allowed to run over the projection 25c by widening the slit 27a. The outer rod section 26, which is inserted on to the guide portion 25d of the inner rod section 25 from the rear, is retained in a location in which the front end face 26a thereof abuts against the projection 25c of the inner rod section 25. The outer rod section 26 is integrally formed at its rear end with a connecting portion 26b to which the brake pedal 12 is connected. The guide portion 25d and the projection 25c of the inner rod section 25 and the end face 26a of the outer rod section 26 constitute the coupling means 28.

The operation of the embodiment will be described below.

When a depressing force is applied to the brake pedal 12 to brake the vehicle, and the input rod 10 and the valve piston 13 coupled to the input rod 10 are advanced, the booster piston 3 is not initially moved. Hence, the second valve seat $16_2$ of the valve piston 13 is moved away from the valve member 15 of the control valve 14. This causes the working chamber B to communicate with the air inlet 6 through the through-hole 21 to the atmosphere. The booster piston 3 is advanced by a difference in pressure generated between the vacuum chamber A and the working chamber B, thereby enabling the master cylinder M to be operated through the output rod 22. When the depressing force on the brake pedal 12 is released, the input rod 10 is first retreated along with the valve piston 13 by a resilient force of the return spring 8. The second valve seat $16_2$ seats on the valve member 15, while causing the valve member 15 to leave the first valve seat $16_1$. As a result, the vacuum chamber A and the working chamber B communicate with each other through the through-hole 20, so that the difference in pressure between both chambers is decreased. Thus, the booster piston 3 is retreated by the resilient force of the return spring 7 to cancel the operation of the master cylinder M.

Figure 4A:
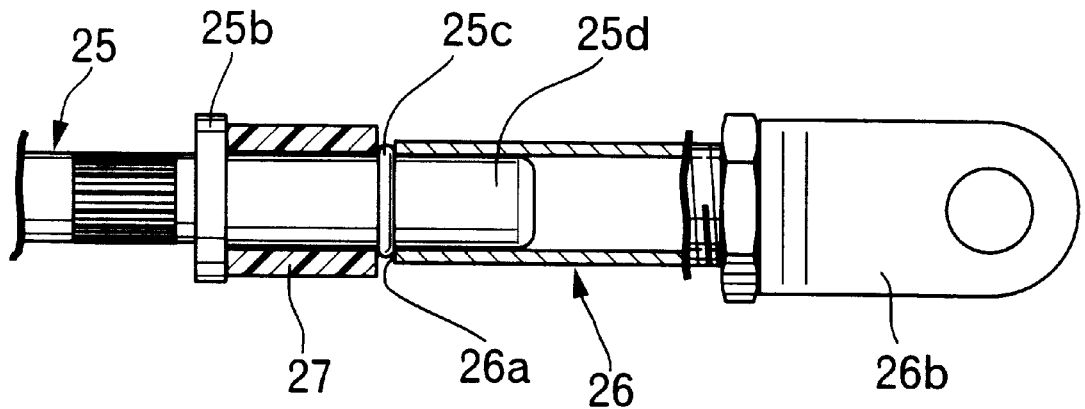
Figure 4B:
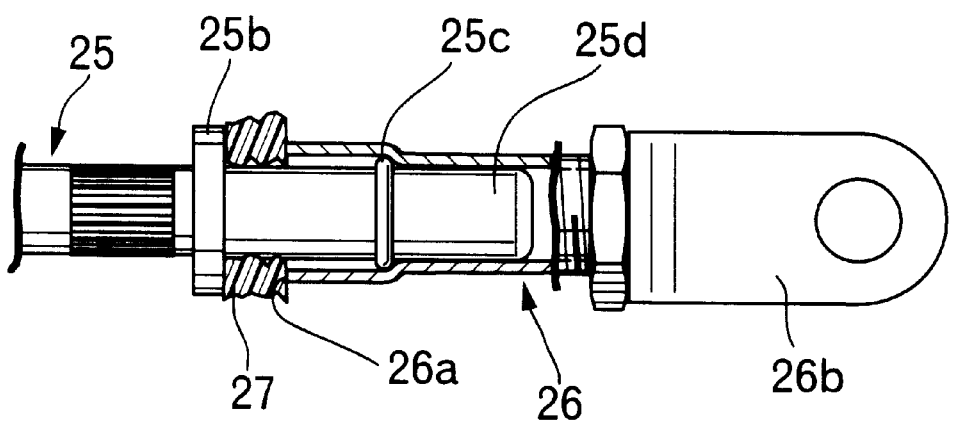

When a normal depressing force is being applied to the brake pedal 12 by a driver's braking operation, the axial compressing force, which is applied forward to the outer rod section 26, is transmitted from the end face 26a of the outer rod section 26 via the projection 25c to the inner rod section 25. When the master cylinder M has been retreated toward the vehicle compartment along with the dash board 24 upon a collision of the automobile, an axial compressing force, which is larger than the normal depressing force, is applied to the push rod 10, if the driver's foot is on the brake pedal 12. As shown in FIGS. 4A and 4B, if the axial compressing force exceeds a predetermined value, the outer rod section 26 slides forward with respect to the inner rod section 25 by the end face 26a of the outer rod section 26 running over the projection 25c of the inner rod section 25. As a result, the pushing-up of the brake pedal 12 toward the vehicle compartment by the retreating movement of the master cylinder M is prevented, and the load applied to the foot of the driver is alleviated. It should be noted that the axial compressing force permitting the end face 26a of the outer rod section 26 to overrun the projection 25c can be regulated to any value by changing the height and/or shape of the projection 25c.

When the outer rod section 26 slides forward with respect to the inner rod section 25, the outer rod section 26, having run onto the projection 25c, is deformed so that its diameter is increased. The buffer member 27, which is clamped between the end face 26a of the outer rod section 26 and the stopper 25b of the inner rod section 25, is squashed. Thus, a shock generated during forward sliding of the inner rod section 26 can be buffered to further effectively alleviate the load applied to the driver's foot.

A second embodiment of the present invention will now be described with reference to FIGS. 5 to 8.

As shown in FIG. 5, an upper dash board 35 extends substantially horizontally and a lower dash board 36 extends substantially downwards from the upper dash board 35. The upper and lower dash board 35 and 36 are provided in a front portion of a vehicle compartment of an automobile. A vacuum booster VB, having a master cylinder M integrally mounted thereon, is supported on the lower dash board 36. The master cylinder M and the vacuum booster VB constitute a brake hydraulic pressure generating means of the present invention.

A brake pedal 12 is rotatably supported through a pin 38 at its upper end on a pedal bracket 37. The pedal bracket 37 connects the upper dash board 35 and the lower dash board 36 to each other. A push rod 10, which extends rearwards from the vacuum booster VB, is supported at its rear end on an intermediate portion of the brake pedal 12 through a pin 39. An axis L of the push rod 10 is inclined, so that a rear portion of the axis L is at a lower level than a horizontal plane P.

Figure 6:
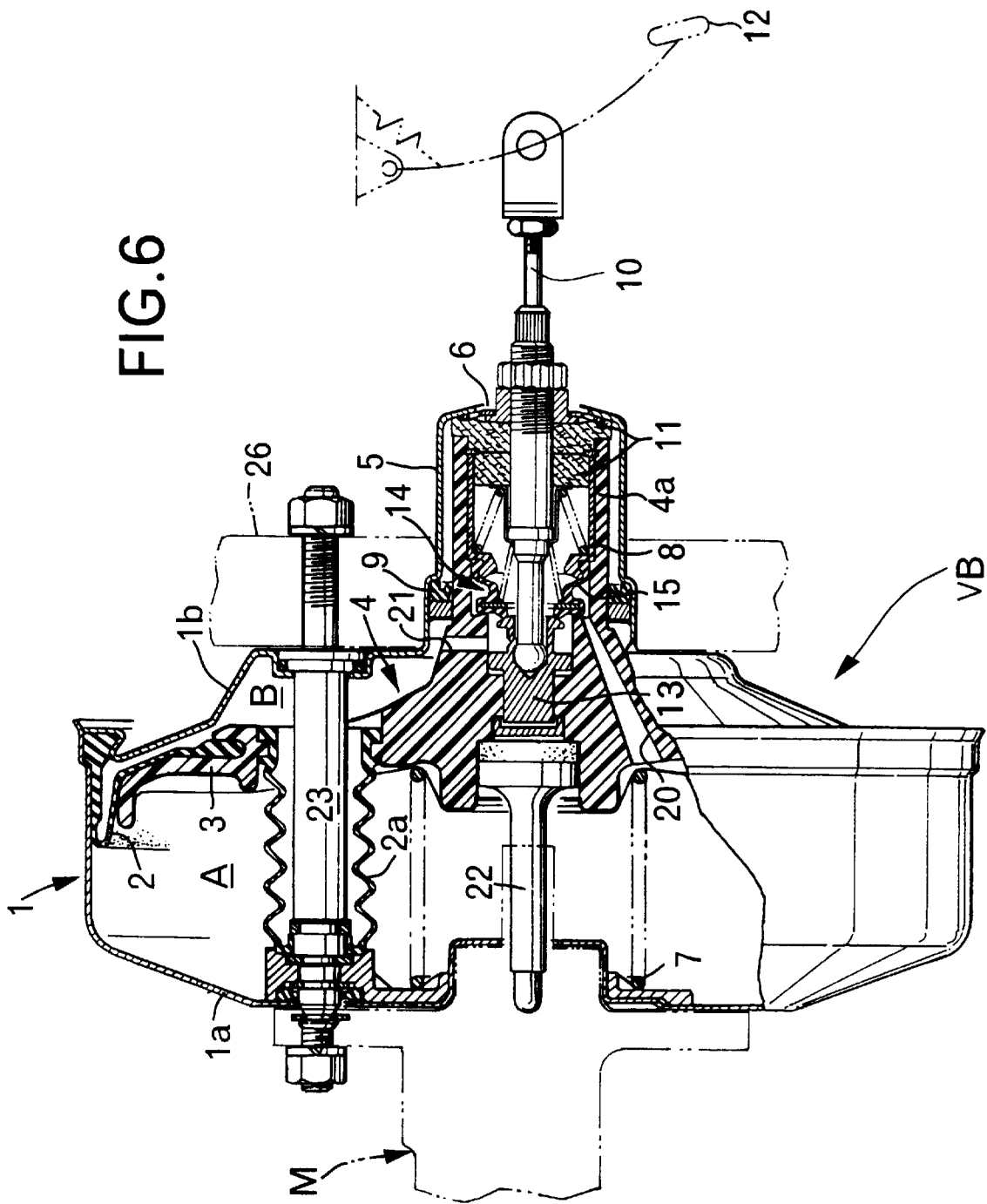

Although the push rod 10 of the vacuum booster VB in the first embodiment shown in FIG. 1 has been separated into the inner and outer rod sections 25 and 26, with the buffer member 27 mounted between both the rods 25 and 26, the push rod 10 of the vacuum booster VB in the second embodiment shown in FIG. 6 is formed from a simple rod. The other structures of the vacuum booster VB are common in the first and second embodiments.

The operation of the second embodiment will be described below. The basic operation of the vacuum booster VB in the second embodiment is the same as in the first embodiment and hence, duplicated description is omitted.

Figure 7:
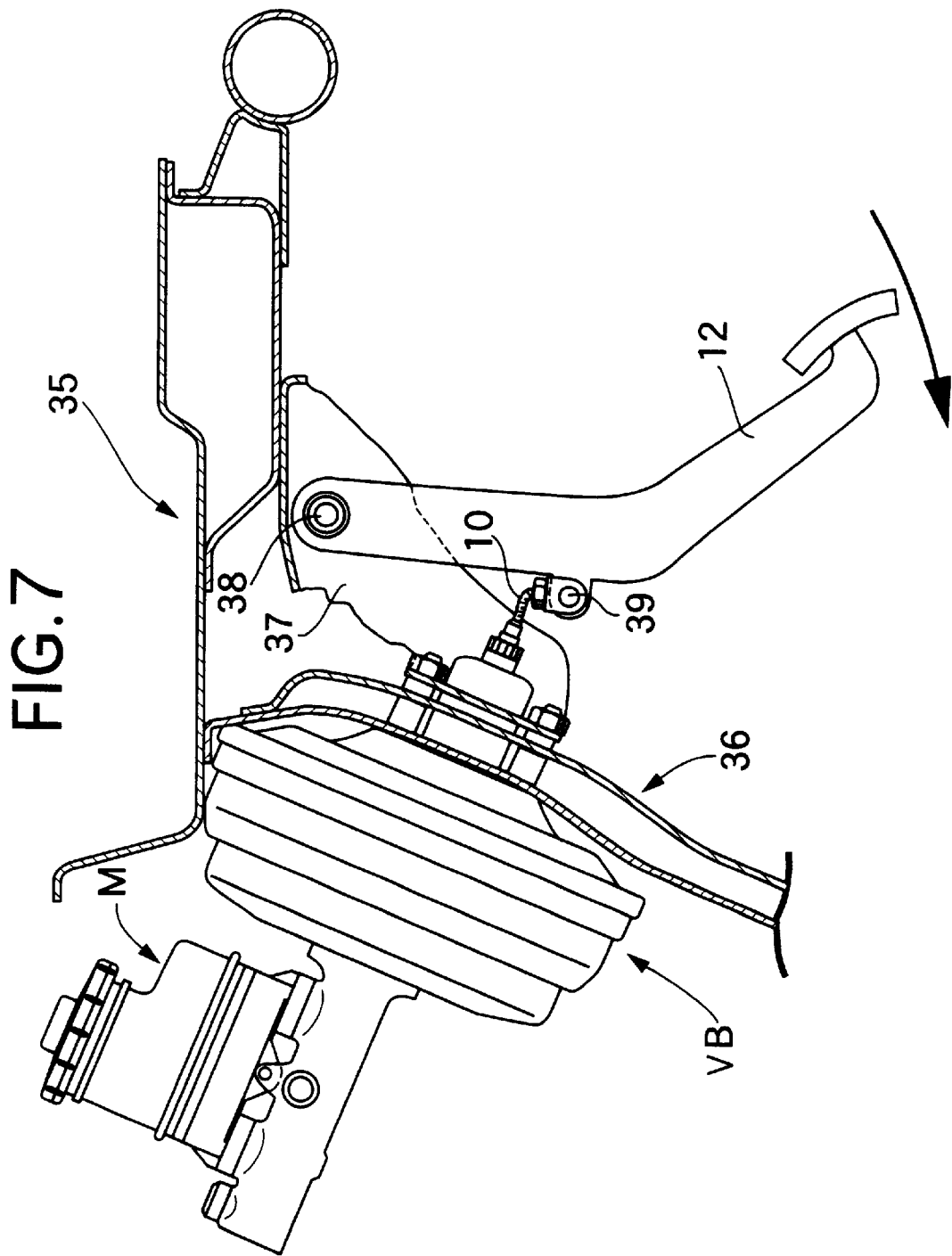

When the driver applies a depression force to the brake pedal 12, an axial compressing force is applied to the push rod 10. However, the push rod 10 has a strength such that it is not flexed by the depression force. However, when the lower dash board 36 and the pedal bracket 37 are deformed upon collision of the automobile as shown in FIG. 7, the master cylinder M is retreated toward the vehicle compartment along with the lower dash board 36. An axial compressing force, which is larger than the normal depressing force, is applied to the push rod 10, if the driver's foot is on the brake pedal. At this time, the vacuum booster VB is retreated substantially horizontally along the horizontal plane P. However, a flexing load is applied to the push rod 10, which protrudes rearwards from the vacuum booster VB, to flex (or deform) the push rod 10 downwards since the axis L of the push rod 10 is inclined toward the vertical with respect to a horizontal plane. As a result, the brake pedal 12 is rotated forward, whereby the pushing-up of the brake pedal 12 toward the vehicle compartment by the retreating movement of the master cylinder M is prevented, and the load applied to the driver's foot is alleviated.

Figure 8:
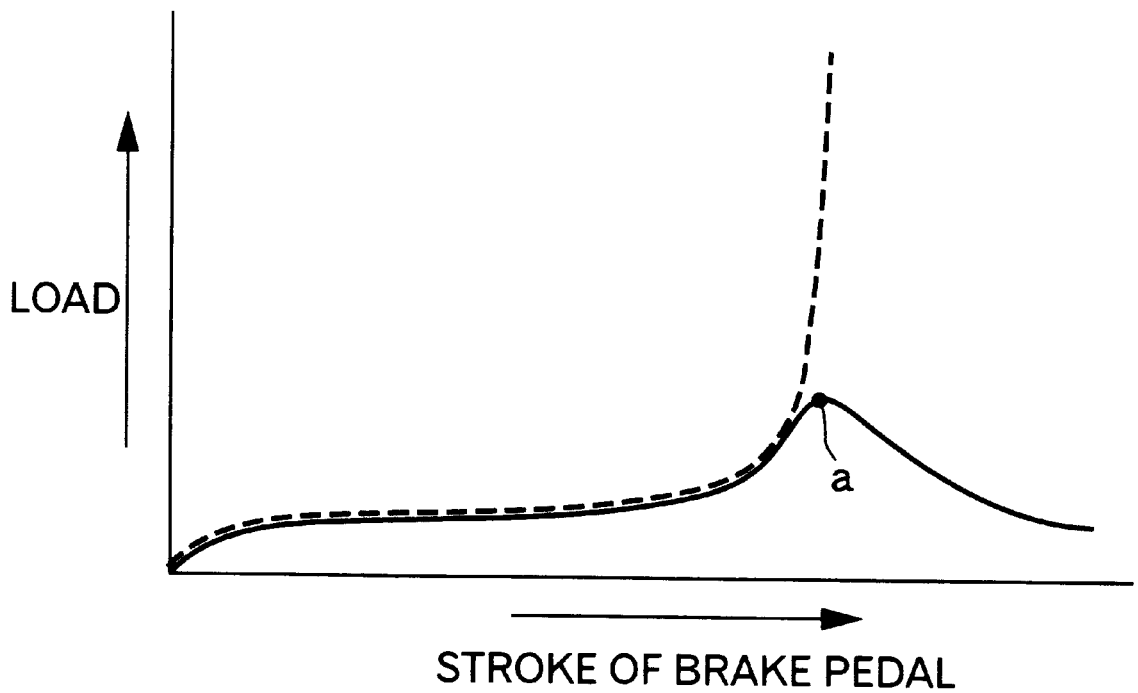

A broken line in FIG. 8 shows how the load received by the driver's foot is varied with respect to the stroke of the brake pedal 12, when a dis-flexible push rod 10 having a higher strength is used. In this case, it can be seen that when the stroke of the brake pedal reaches a limit position, the load rises suddenly. On the other hand, a solid line in FIG. 8 shows a variation in load in the present embodiment, wherein when the load is increased to a point a, a further increase in load can be avoided by the flexing of the push rod 10.

The present invention has been applied to the push rod 10 of the vacuum booster VB in the first and second embodiments, but in a brake device having no vacuum booster VB, the present invention can be applied to a push rod of a master cylinder M. In addition, the inner rod section 25 has been disposed on the front side and the outer rod section 26 has been disposed on the rear side in the first embodiment, but the positional relationship between the inner and outer rod sections can be reversed. The stopper 25b and the projection 25c of the inner rod section 25 are not necessarily annular and can be formed from a step and a plurality of small projections disposed circumferentially. If a brittle portion is previously formed at a portion of the push rod 10 in the second embodiment, the push rod 10 can be further reliably flexed upon a collision of the automobile.

Although the embodiments of the present invention have been described in detail, it will be understood that the present invention is not limited to the above-described embodiments, and various modifications in design may be made without departing from the spirit and scope of the present invention defined in claims.

What is claimed is:

1. A brake device for an automobile, comprising:

a brake hydraulic pressure generating means for generating a brake hydraulic pressure;

a push rod of said brake hydraulic pressure generating means; and a brake pedal operated by a driver and connected to said push rod, wherein said push rod includes
an inner rod section,
an outer rod section axially slidably supported on an outer periphery of said inner rod section, and
a coupling means for integrally coupling both said inner and outer rods to each other, said coupling means being adapted to release the coupling to permit said outer rod section to slide when an axial compressing force, which is equal to or larger than a predetermined value, is applied between both said inner and outer rods.

2. A brake device for an automobile according to claim 1, wherein an end face of the outer rod section is put into contact with a projection formed on said outer periphery of said inner rod section, and wherein when said axial compressing force is applied between both said inner and outer rods, said end face of the outer rod section slides over and past said projection.

3. A brake device for an automobile according to claim 2, further including a buffer member which is supported between a stopper formed on said outer periphery of said inner rod section and said projection, wherein the end face of the outer rod section in sliding pushes said buffer member against said stopper to buckle said buffer member.

4. A brake device for an automobile, comprising:

a brake hydraulic pressure generating means for generating a brake hydraulic pressure;

a push rod of said brake hydraulic pressure generating means;

a brake pedal operated by a driver and connected to a rear end of said push rod, wherein an axis of said push rod is inclined with respect to a horizontal plane, and
wherein when an axial compressing force, which is equal to or larger than a predetermined value, is applied to said push rod upon a collision of the automobile, a portion of said push rod is downwardly deformed by said axial compressing force to permit movement of said brake pedal in a forward direction of a vehicle body.

* * * * *